J. FORTUN.
Stake Holder for Railroad Cars.
No. 51,278.
Patented Nov. 28, 1865.
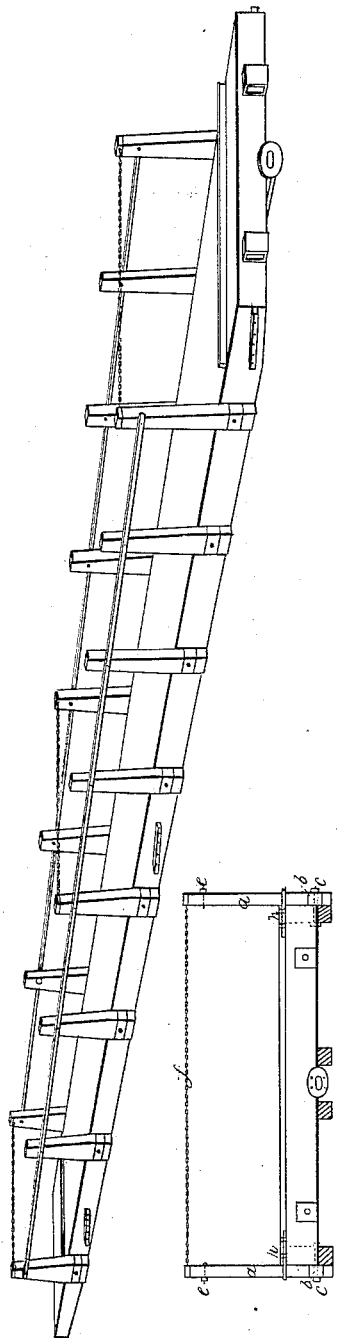
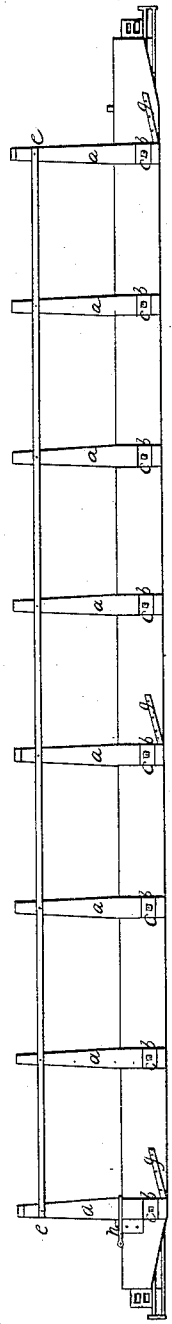
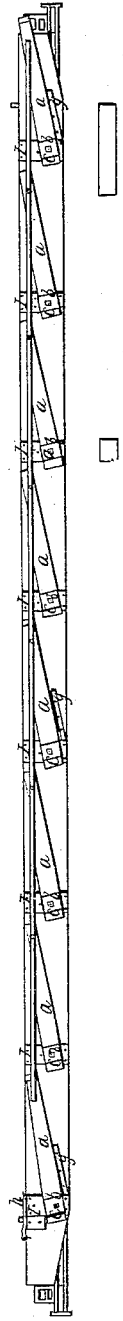
Witnesses:
Inventor:

UNITED STATES PATENT OFFICE.

JOAQUIN FORTUN, OF CIENFUEGOS, ISLAND OF CUBA.

MODE OF ATTACHING STAKES TO RAILROAD-CARS.

Specification forming part of Letters Patent No. 51,278, dated November 28, 1865.

*To all whom it may concern:*

Be it known that I, JOAQUIN FORTUN, of Cienfuegos, in the Island of Cuba, have invented a new and Improved Mode of Attaching Side Stakes to Railroad Platform-Cars; and I do hereby declare that the following is a full and exact description thereof, reference being had to the accompanying drawings, and to the letters of reference thereon.

The nature of my invention consists in so attaching the side stakes to railroad platform-cars that they may all at the same time be lowered and raised at will, avoiding the necessity of taking them off one by one when in the act of loading and unloading.

To enable others skilled in the art to make and use my invention, I will proceed to describe its construction and operation.

I construct my car-beds in any of the known forms, and to the sides thereof I attach the stakes $a\,a$, as shown in the drawings, by means of iron bolts $c\,c$, that pass through the stakes and outside timber of the car-bed at the point where the bolts pass, and on the stakes I place a wrought-iron band, $b\,b$, to prevent the stakes splitting. Between the stakes and the timber, and firmly fastened to the timber, I place an iron plate, $I\,I$, to prevent the wearing of the wood. Near the top of the stakes I attach a horizontal flat iron bar, $e\,e$, by means of small bolts that pass through the bar and the stakes. This completes the mode of construction.

I now proceed to operate them: As the horizontal bar $e\,e$ connects all the stakes together, and as each is so made as to turn on the bolts $c\,c$, I lower the stakes all at the same time till they occupy the position represented in the plan, side view, stakes down. The two end and one of the center stakes rest on a piece of wood, $g\,g$, firmly bolted to the side of the car, which prevents them from falling lower, the horizontal bar $e\,e$ sustaining the other stakes. When the stakes are in a vertical position, as in side view, stakes up, the pieces of wood $g\,g$ butt against the lower part of the stakes, and thus prevent them from going past a perpendicular, and the bent iron bar $h\,h$ is to secure them in a vertical position.

What I claim as my invention, and desire to secure by Letters Patent, is—

The application to railroad platform-cars of side stakes so constructed as to turn down alongside of the car in one operation, as herein described, thus saving much time.

JOAQUIN FORTUN.

Witnesses:
J. S. MURRAY,
JAMES F. SWEENY.